Aug. 12, 1952     A. A. GARNER     2,606,387
METAL FISH LURE
Filed Aug. 5, 1948
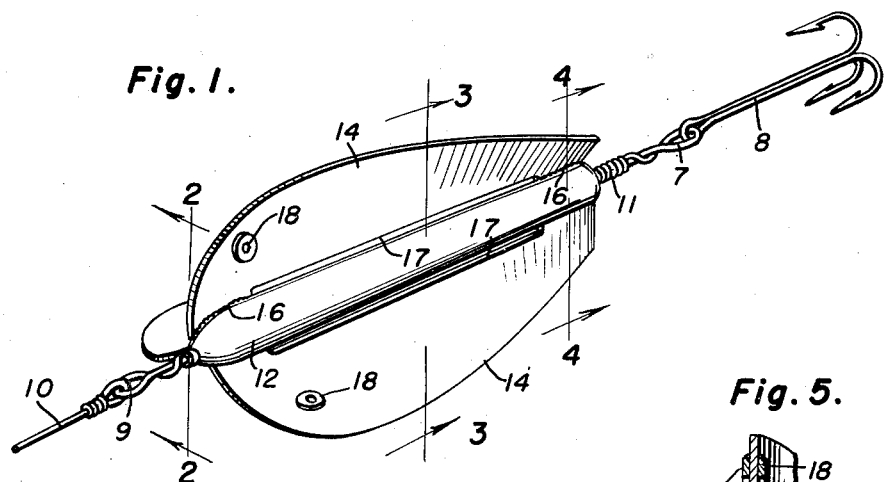
Fig. 1.
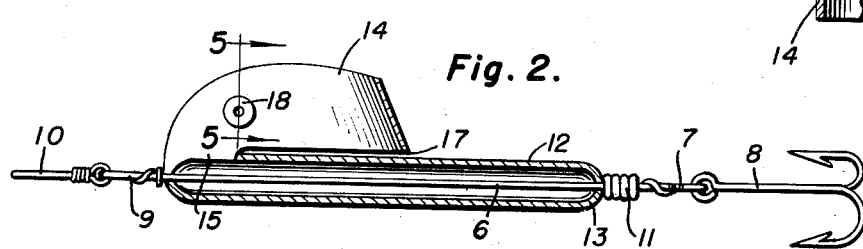
Fig. 2.
Fig. 5.
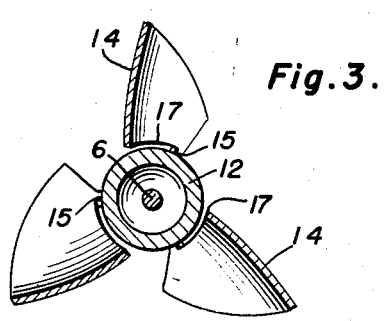
Fig. 3.
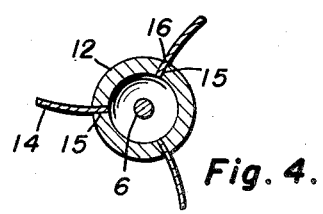
Fig. 4.
Arnold A. Garner
INVENTOR.

Patented Aug. 12, 1952

2,606,387

UNITED STATES PATENT OFFICE 2,606,387

METAL FISH LURE

Arnold A. Garner, St. Cloud, Minn.

Application August 5, 1948, Serial No. 42,663

1 Claim. (Cl. 43—42.2)

The present invention relates to artificial baits and lures used by anglers for casting and trolling, while fishing.

More specifically, the invention has to do with rotatable and spinner-type lures wherein a fin equipped body is mounted for rotation on a straight shaft, the shaft being provided at the trailing end with multiple prong fishing hook means and provided at the opposite end with an eye to accommodate the usual fishing line. Artificial baits and lures in this category are old and well known. Therefore, the purpose of the instant invention is to structurally and otherwise improve upon known types of lures, the improvements existing in the spinner or rotor and the latter being characteristic in that longitudinally spiralling circumferentially spaced fins are mounted on a tubular hub portion, the intermediate portions of the inner edges of the fins, the edges close to the surface of the hub, being spaced from said surfaces and the coaction of features being such that the fins not only cause the spinner to rotate but also govern the depth of fishing when trolling and casting. Thus, the faster one reels in or trolls, the fins cause the hub to come to the surface. By regulating the speed of movement of the device so that it is relatively slow, the same will sink.

Other objects and advantages will become readily apparent from the following description in the accompanying illustrative drawings.

In the drawings, wherein like numerals are employed to designate like parts throughout the views:

Figure 1 is a perspective view of an artificial bait or lure constructed in accordance with the principles of the present invention, Figure 2 is a longitudinal sectional view taken approximately on the line 2—2 of Figure 1, Figure 3 is a cross section on the line 3—3 of Figure 1 looking in the direction of the arrows, Figure 4 is a section on the line 4—4 of Figure 1, Figure 5 is a fragmentary section on an enlarged scale on the line 5—5 of Figure 2.

Referring now to the drawings by distinguishing reference numerals and lead lines, the numeral 6 designates what may be conveniently referred to as a substantially rigid shaft, the same having an eye 7 at the trailing end to accommodate the shank of the multiple prong hook means 8. There is a similar eye at the opposite end at 9 to accommodate the fishing line 19. The numeral 11 designates beads mounted on the shaft between the eye and the adjacent rear end of the hollow hub 12. The end of the latter is convexed, as at 13, to provide anti-friction contact with the beads and the beads thus serve as anti-thrust bearings. The nose portion of the hub is also rounded off to ride in contact with eye means 9 as shown in Figures 1 and 2. Carried by the surface of the hub are like circumferentially spaced equidistant longitudinally extending fins denoted individually by the numerals 14. These fins are of copper, if desired, and they are of a length commensurate with the length of the hub portion 12. That is to say, each fin extends from the nose at the front to the rear trailing end and in fact the hub at opposite ends has slots formed therein and these serve to accommodate laterally directed terminal end portions of the respective fins, said end portions 15 being soldered in place as at the points 16. It will be noted, in this connection that only the extreme end portions of the fins are anchored on the hub. The remaining edge portions, denoted at 17, are spaced from coacting surfaces of said hub. The rear end portions of the fins are slightly narrower than the front portions and it is believed that because of the shapes of the fins they may be said to spiral partly around the hub to provide the desired twirling and rotating effect thus converting the hub in conjunction with the fins into a unit which may be described either as a spinner or a rotor. As a matter of fact, it is not so much the spinning effect in which I am interested but rather the ability of the spinner to serve as an impeller which actually drives the bait through the water. By spirally attaching the fins and making the fins as long as the hub and leaving the spaces between the inner edges 17 and the surfaces of the hub I have found, from experience, that by moving the bait with considerable rapidity through a body of water, the fins cause same to ride up toward the surface. On the other hand, by reeling the line in slowly or trolling at a slow rate, the speed of rotation of the rotor is relatively slow and consequently the bait has a tendency to sink.

To add to the attractiveness and alluring possibilities of the device I provide attractive eyes. These are simple washers 18 mounted on opposite sides of the forward end portions of the respective fins and soldered or otherwise mounted in place. These eyes are preferably bright red and in contrast with the copper color of the fins they produce an effective display effect.

If, instead of using washers it is found more satisfactory to employ half glass beads properly strung and mounted in place, such an alternate adaptation is believed to be within the sphere of my invention, obviously.

I also desire to state that while the treble hook means on the rear is shown plain, certain of the lures which I turn out will, of course, be otherwise constructed. That is to say, I may partly conceal the hooks with hairy hackles or may employ attractive feathers or the like, as is often done in this line of endeavor.

The body portion 12 of the device in practice may be made of copper, nickle or chromium plated or painted or decorated in any desired color or fashion, as is evident.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice so long as no departure is made from the invention as claimed.

Having described the invention, what is claimed as new is:

An artificial bait comprising an elongated hollow body of cylindrical cross-sectional form, said body constituting a hub and having convex leading and trailing end portions apertured and providing bearings for a shaft on which said hub is adapted to be rotatably mounted, said hub being provided at one end with a group of three equidistant circumferentially spaced slots and being provided at its opposite end with a second group of three equidistant circumferentially spaced slots, the latter three slots being circumferentially staggered in respect to the first-named three slots, all of said slots being comparatively short and opening communicatively into the bore of said hub, and three like helically curved radial fins commensurate in lengths with the length of said hub and having straight inner longitudinal edge portions in closely spaced parallelism relative to the external surface of the hub and having laterally directed terminal extensions at their respective opposite ends, said slots being paired to provide three pairs of slots, each pair embodying one front and one rear slot, there being one fin for each pair of front and rear slots, and said terminal extensions being lodged and secured in their respective pair of slots, said fins being disposed at circumferentially spaced equidistant points in relation to each other, having curvate forward edge portions merging into the leading end of the hub and defining helical open ended channelways between themselves.

ARNOLD A. GARNER.

REFERENCES CITED

The following references are of record in the file of this patent:

UNITED STATES PATENTS

| Number | Name | Date |
|---|---|---|
| 13,068 | De Saxe | June 12, 1855 |
| 295,350 | Chapman | Mar. 18, 1884 |
| 341,261 | McHarg | May 4, 1886 |
| 1,002,785 | Telford | Sept. 5, 1911 |
| 1,242,556 | Jay | Oct. 9, 1917 |
| 1,293,500 | Mason | Feb. 4, 1919 |
| 1,610,029 | Wyrill | Dec. 7, 1926 |
| 1,617,318 | Brown | Feb. 15, 1927 |
| 1,750,604 | Pflueger | Mar. 11, 1930 |
| 1,797,234 | Jordan | Mar. 24, 1931 |
| 1,803,777 | Speich | May 5, 1931 |
| 1,932,622 | Gruenhagen | Oct. 31, 1933 |
| 1,989,850 | Dorsey | Feb. 5, 1935 |
| 2,175,635 | Mertens | Oct. 10, 1939 |
| 2,216,929 | Zander et al. | Oct. 8, 1940 |

FOREIGN PATENTS

| Number | Country | Date |
|---|---|---|
| 363,303 | Great Britain | Dec. 17, 1931 |